US 6,641,649 B2

(12) United States Patent
John et al.

(10) Patent No.: US 6,641,649 B2
(45) Date of Patent: Nov. 4, 2003

(54) FIRE RESISTANT COMPOSITIONS

(75) Inventors: Anthony Jacob John, St Albans (AU); Per Ingmar Quist, Carrum (AU)

(73) Assignee: Novio Phenolic Foam Pty Ltd, Victoria (AU)

(*) Notice: Subject to any disclaimer, the term of this patent is extended or adjusted under 35 U.S.C. 154(b) by 0 days.

(21) Appl. No.: 10/149,654

(22) PCT Filed: Dec. 14, 2000

(86) PCT No.: PCT/AU00/01537

§ 371 (c)(1),
(2), (4) Date: Oct. 15, 2002

(87) PCT Pub. No.: WO01/44404

PCT Pub. Date: Jun. 21, 2001

(65) Prior Publication Data

US 2003/0116054 A1 Jun. 26, 2003

(30) Foreign Application Priority Data

Dec. 14, 1999 (AU) .............................................. PQ4637

(51) Int. Cl.⁷ ...................... C09K 21/02; C09K 21/06; C09D 1/04; C09D 5/18; D21H 19/12
(52) U.S. Cl. .................... 106/18.12; 106/600; 106/620; 106/706; 106/708; 106/790; 106/632; 106/634; 252/601; 252/607; 428/532; 428/537.1; 428/537.7; 428/920; 428/921

(58) Field of Search ............................... 106/18.12, 600, 106/620, 706, 708, 790, 632, 634; 252/601, 607; 428/532, 537.1, 537.7, 920, 921

(56) References Cited

U.S. PATENT DOCUMENTS

| | | | | |
|---|---|---|---|---|
| 3,940,516 A | * | 2/1976 | Gierek et al. ............ | 427/397.7 |
| 3,974,318 A | | 8/1976 | Lilla | |
| 4,746,555 A | | 5/1988 | Luckanuck | |
| 5,045,385 A | | 9/1991 | Luckanuck | |
| 6,040,057 A | | 3/2000 | Slimak et al. | |

FOREIGN PATENT DOCUMENTS

| | | | |
|---|---|---|---|
| JP | 57038362 A | * | 3/1982 |
| JP | 10306235 | | 11/1998 |

* cited by examiner

*Primary Examiner*—Anthony J. Green
(74) *Attorney, Agent, or Firm*—Pillsbury Winthrop LLP

(57) ABSTRACT

An aqueous fire resistance treatment composition consisting of water, sodium silicate, a calcined filler and a latent acid catalyst is disclosed. The composition may be applied to cardboard substrates such as corrugated cardboard. The composition is then cured to provide enhanced fire resistance.

16 Claims, No Drawings

FIRE RESISTANT COMPOSITIONS

This application is the National Phase of International Application PCT/AU00/01537 filed Dec. 14, 2000, which designated the U.S.

FIELD OF THE INVENTION

This invention relates to fire resistant coatings and to cellulosic materials modified with such coatings to render them fire resistant. The invention relates also to methods of making cellulosic materials fire resistant.

BACKGROUND OF THE INVENTION

Cellulosic materials such as timber and particle board are widely used as building materials. There are many cellulosic materials for which it is desirable to have some degree of fire resistance. For example, there are many building materials which, if rendered at least with some degree of fire resistance, will slow down the process of a fire contained therein thus providing essential safety for any occupants thereof. These building materials include timber, wall boards of many types; surface materials that are placed within a building structure, for example, ceiling tiles. If these materials could be rendered at least partially fire resistant, any resulting fire would be of a slow burning nature and thus improve the safety of the occupants of the building.

Cardboard is a cellulosic material that generally has a limited use as a building material being usually restricted to use as reinforcing in flush panel doors. However, cardboard offers the desirable properties of relatively high strength to weight ratio, especially stiffness, combined with low cost. In the case of corrugated cardboard it also offers low thermal conduction which is attributed to the presence of air entrapped in the corrugated cardboard flutes. Despite these attractive benefits, the use of cardboard has been limited because of its combustibility and lack of adequate fire resistance. By fire resistance it is meant that cellulosic materials treated as taught within the ambit of this invention by the solutions described herein, will exhibit a substantial reduction in the propensity to support a fire.

There have been various attempts to improve the fire resistance of cellulosic materials. In the case of cardboard material, these have included soaking cardboard panels in aqueous solution of sodium silicate. However, such coatings have not proven satisfactory as they have poor water resistance. Furthermore, on exposure to flames the coating can melt or crack exposing the combustible cardboard to the flames.

Dimanshtaeyn, U.S. Pat. No. 5,035,851, Jul. 30, 1991 describes the use of coating solution which includes a silicate, a clay and some inorganic materials (e.g. a borate) which can be used to coat metals, woods and foamed polymeric materials to impart some degree of fire resistance thereto. This is a complicated and expensive solution and acceptable resistance to fire is not always achieved.

Luckanuck in U.S. Pat. No. 5,085,897, Feb. 4, 1992 describes a liquid mixture of silicate and an inert mineral fibre a mineral powder which is used to coat steel beams used within buildings. This solution, when coated on the steel building materials, is said to help reduce twisting of steel columns and other building materials in a fire. The treatment does not include a reactive calcined filler nor a latent acid catalyst.

Nguyen et al., U.S. Pat. No. 4,888,057, Dec. 19, 1989 describes a composite fire resistant coating which comprises a mixture of silicates and silicon carbide powder. It is said that building materials coated with these materials are resistant to fire. However, this coating is complicated and expensive to use.

U.S. Pat. No. 6,040,057 (Mar. 21, 2000) involves the treatment of a cellulosic substrate with an alkali metal treated material to render the alkali metal silicate water insoluble.

U.S. Pat. No. 3,940,516 (Feb. 24, 1976) relates to compositions consisting of:
- 5 to 15% of powdered silicate-oxide sinter or alloy
- 15 to 35% of an anhydrous powdered alumina silicate
- 50 to 80% of acid phosphates of aluminium, chromium, magnesium or calcium.

The above compositions lack alkali metal silicates.

U.S. Pat. No. 5,171,496 (Dec. 15, 1992) discloses wood composites. The compositions include blast furnace slag and are cured by heating. The compositions are not ordinarily fire resistant but can be rendered such by modifying the cellulosic materials. The composition without the treated cellulose is thus not a fire resistant composition. These compositions of this citation are also calcium rich and this is important to this reaction mode.

SUMMARY OF THE INVENTION

This invention provides in one form an aqueous fire resistance treatment composition comprising:
- water;
- a metal silicate selected from an alkali metal silicate or an alkaline earth metal silicate;
- a reactive calcined filler;
- a latent acid catalyst.

The alkali metal silicate is preferably selected from the group consisting of potassium silicate, sodium silicate and lithium silicate. The alkaline earth metal silicate solution is preferably selected from the group consisting of beryllium silicate, magnesium silicate and calcium silicate.

Preferably the metal silicate is selected from the group consisting of sodium silicate and potassium silicate.

More preferably the metal silicate is sodium silicate.

Preferably the reactive calcined filler is selected from the group consisting of alumina and alumino silicates.

In an alternative form this invention provides a method of treating cellulosic substrates to render them fire resistant by treating the substrate with a composition comprising:
- water;
- a metal silicate selected from an alkali metal silicate or an alkaline earth metal silicate;
- a reactive calcined filler;
- a latent acid catalyst and allowing the treatment to dry and cure.

Preferably the treatment includes a dried, cured coating having a film thickness in the range 50–1000 $\mu$m.

In a still further form this invention provides cellulosic material treated with a fire resistant composition formed by curing a composition comprising:
- water;
- a metal silicate selected from an alkali metal silicate or an alkaline earth metal silicate;
- a reactive calcined filler;
- a latent acid catalyst.

Preferably the cellulosic material is coated with the fire resistant composition.

DETAILED DESCRIPTION OF THE INVENTION

Sodium silicate is the preferred metal silicate. However, other metal silicates may be used including mixtures of different metal silicates.

The preferred sodium silicate is manufactured by PQ Industries. This material is an aqueous solution which is basically comprised of $SiO_2/Na_2O$.

Examples of suitable solutions of sodium silicate are Vitrosol N and Vitrosol H, both available from PQ Australia. Vitrosol N is a 38% w/w solution in water.

The reactive calcined filler is preferably selected from calcined alumina and calcined alumino silicate. These materials fall into the class of fillers known as pozzolans. These are defined as materials which in finely divided form and in the presence of water, chemically react with calcium hydroxide at ordinary temperatures to form compounds having cementitious properties. Examples of suitable materials are calcined flint clay, calcined alumina, fly-ash and blast furnace slag. The filler is described as reactive in that it can react with alkaline water and/or the metal silicate. The filler is thus distinct from conventional fillers such as talc and clay. These reactive fillers are readily available and generally of low cost. Fly-ash is a finely divided glossy material generated from combustion of pulverised coal in modern power plants. They have previously found use in modified concretes where lower costs and higher long term strengths can be achieved. The particle size of the reactive fillers is important for best results and these are achieved when the maximum particle size is less than 150 $\mu$m. Generally better results are achieved with smaller particles and those that pass through a 75 $\mu$m sieve produce improved performance.

The latent acid catalyst is preferably a modified organic acid, especially an ester, which becomes active under the conditions of treatment with the composition. Preferred latent acid catalysts are esters of acetic acid and esters of dibasic acids such as glutaric, succinic and adipic. An example of suitable latent acid catalysts is glycerol triacetate. Under the alkaline conditions of the composition the ester group hydrolyses leaving free acid which acts as the catalyst. Various other substances, such as phosphates and borates, will also hydrolyse in the aqueous, alkaline mixture of the invention, in the process reducing the pH and causing the mixture to set. An example of such latent catalysts is trisodium meta phosphate. The use of latent acid catalysts allows adequate pot-life to allow the treatment composition to be applied onto the surface. The selection of latent acid catalyst allows the reaction time to be adjusted to give adequate pot-life for the method of application. Generally, the dibasic acid catalysts give slower set and longer pot-life than the glycerol triacetate. Latent catalysts are materials which do not act as catalysts themselves or are relatively inactive but are converted to catalysts or more active catalysts by means of chemical or physical changes. It should be noted that, in the context of this patent, a latent catalyst includes any substance that, when added to the alkaline mixture of the invention, chemically or physically changes to a substance that reduces the pH of the mixture, causing the mixture to set. Such substances are preferably added in anhydrous form, in which case they often absorb excess moisture in the formulation, thus speeding the drying of the finished produce A further example of a latent catalyst is the use of carbon dioxide, preferably present in the atmosphere, or supplied via a pressure vessel. The carbon dioxide can form carbonic acid on absorption into the composition thereby causing the composition to set. A further example of a latent acid catalyst is one that becomes activated by increasing the temperature of the composition.

The relative properties of the constituents of the compositions of the present invention influence the properties of both the liquid and cured coatings. To enable application by dipping or flow coating it is important that the composition have relatively low viscosity. Viscosities in the range of 150–250 cps have been found to be particularly suitable. However, viscosities considerably in excess of 250 cps can be used. For example, viscosities of 2500 cps or more may be suitable, especially if the composition is shear thinning or pseudoplastic. Shear thinning rheology is well known and is characterised by a reduction in viscosity as the shear rate increases. The viscosity of the sodium silicate solution as modified with the filler is often suitable without further adjustment. However, additional rheology modifying agents, both organic and inorganic may be incorporated to adjust the rheology.

The weight ratio of reactive calcined filler to the metal silicate is normally in the range of 4:1 to 1:4, preferably 3:1 to 1:3 and more preferably 2:1 to 1:2. However, low levels of reactive filler can produce useful compositions. These weight ratios are expressed as the weight of reactive calcined filler to the metal silicate as a 38% aqueous solution. When expressed on a non-volatile basis the range 4:1 to 1:4 becomes 10:1 to 1:1.5, 3:1 to 1:3 becomes 8:1 to 1:1.1, and 2:1 to 1:2 becomes 5:1 to 1:0.8. Relatively high levels of calcined filler can lead to thixotropic compositions which can be difficult to use with corrugated cardboard as the cellulosic substrate because the penetration of the composition into the flutes is poor. The cure rate at high levels of calcined filler is usually slower and this can be less useful in some circumstances. The quantity of latent acid catalyst is normally in the range of 1.0–10% of the total composition.

As well as the components specified above, other ingredients may also be present. These include surfactants or wetting agents which may effect the surface tension and surface wetting characteristics of the composition as well as the rheology of the composition. Preferred surfactants are non-ionic in nature and especially preferred are alkyl glucosides. The surfactants and wetting agents can also aid the dispersion of the filler.

Inert fillers such as clays and talcs may be used to modify the properties of the coatings. Other types of fillers may also be used to confer property enhancement or cost reduction. For example, hollow, glass or ceramic microspheres may be used to enhance thermal and other insulation properties. Anhydrous hygroscopic fillers may also be added. An example of such a material is anhydrous silica gel, used in desiccators. A further example is anhydrous sodium sulphate. Dyes and pigments may also be used. The use of these colouring materials can provide useful guides as to whether the substrate has been treated.

The compositions of the present invention are applied to cellulosic material substrates and the compositions can impregnate and/or form a coating on the substrate. The compositions can then be cured to form fire resistant compositions. The compositions may be applied by any of the usual methods for applying liquid compositions and include spray (air and airless), roller and dip coating. The selection of the most suitable application method will take into account the shape of the article. For substrates formed from corrugated cardboard, conventional coating techniques are quite suitable. However, these substrates may be treated before they are assembled. Reinforced cardboard walls are usually made from flat sheets adhered to interleaved corrugated sheets.

The invention will be described by reference to preferred embodiments described in the following examples where parts are expressed as parts by weight.

EXAMPLE 1

A liquid fire retardant composition was prepared from the following components:

| | |
|---|---|
| calcined flint clay (75 μm) | 4000 g |
| sodium silicate (Vitrosol N) (38% NV) | 4000 g |
| water | 80 g |
| Alkadet 15 (Huntsman Chemicals) | 1 g |
| Dibasic este (DuPont) | 160 g |

The ingredients were combined by adding with mechanical stirring the water and Alkadet to the sodium silicate. The finely divided calcined flint clay was then slowly added under constant stirring. After all the calcined flint clay had been incorporated the dibasic ester latent acid catalyst was added to form the final composition. This composition had a useable pot life of one hour at 25° C. The ratio of reactive calcined filler to metal silicate was 2.6:1 on a non volatile basis.

EXAMPLE 2

The coating composition of Example 1 was evaluated by coating corrugated cardboard.

Two pieces of corrugated cardboard sheets, size 250×250×14 mm, weight 135 g each, incorporating layers of corrugation, were immersed in the composition of Example 1 fully filled. The sheets were then removed and held vertically until fully drained. This procedure resulted in all cardboard surfaces, including the internal corrugation, being covered by a thin coat of the liquid mixture. The composition also impregnated the cardboard to a certain extent. One of the cardboard pieces was placed on a plastic sheet on a table, and the second piece on top of the first, to form a small panel size 250×250×28 mm. The panels were then left to set overnight. The following day the panel was dry to the touch, with a hard coating. The weight of the panel was 890 g. The film thickness was approximately 500 μm.

EXAMPLE 3

In this Example the coated cardboard from Example 2 was tested for fire resistance.

Coated cardboard from Example 2 was aged for 10 days at room temperature and tested by placing it on a gas burner and exposed to the flame for one hour. The temperature on the sample side not exposed to the flame was recorded every 5 minutes. The results are as set out in Table 1:

TABLE 1

| Time (Minutes) | Temperature on Unexposed Side |
|---|---|
| 5 | 25°C. |
| 10 | 52°C. |
| 15 | 75°C. |
| 20 | 81°C. |
| 25 | 89°C. |
| 30 | 100°C. |
| 35 | 131°C. |
| 40 | 140°C. |
| 45 | 140°C. |
| 50 | 140°C. |
| 55 | 141°C. |
| 60 | 141°C. |

The above readings represent very favourable results. If replicated in a full scale fire test to AS 1530.4 a one hour fire rating would have been obtained, on account of both the low temperature and complete structural integrity of the unexposed side. This is a remarkably good result for a cardboard panel coating with only thin (generally less than 1 mm thick) layers of the mixture of the invention. In particular, given the relatively high content of water and sodium in the mixture, it is surprising the bulk of the coating did not blister or crack, leading to rapid heat penetration and fire test failure.

EXAMPLE 4

This is a comparative example where the composition has no calcined filler present. A liquid composition was prepared form the following components:

| | |
|---|---|
| Sodium Silicate (Vitrosol N) (38% NV) | 9000 g |
| Alkadet 15 (Huntsman Chemicals) | 1 g |
| Dibasic ester (DuPont) | 360 g |

The three compounds were thoroughly mixed using a mechanical stirrer, as in Example 1.

EXAMPLE 5

The coating composition of Example 4 was evaluated by coating corrugated cardboard.

Two pieces of corrugated cardboard sheets, size 250×250×14 mm, weight 135 g each, incorporating three layers of corrugation, were immersed in the composition of Example 1 until fully filled. The sheets were then removed and held vertically until fully drained. This procedure resulted in all cardboard surfaces, including the internal corrugation, being covered by a thin coat of the liquid mixture. The composition also impregnated the cardboard to a certain extent. One of the cardboard pieces was placed on a plastic sheet on a table, and the second piece on top of the first, to form a small panel size 250×250×28 mm. The panels were then left to set overnight. The following day the panel was touch dry, with a hard coating. The weight of the panel was 624 g. The film thickness could not be determined as it was colourless.

EXAMPLE 6

In this Example the coated cardboard from Example 5 was tested for fire resistance.

Coated cardboard from Example 5 was aged for 10 days at room temperature and tested by placing it on a gas burner and exposing it to the flame for 17 minutes. The temperature on the sample side not exposed to the flame was recorded The results are as set out in Table 2:

TABLE 2

| Time (Minutes) | Temperature on Unexposed Side |
|---|---|
| 3 | 29°C. |
| 5 | 43°C. |
| 8 | 57°C. |
| 10 | 68°C. |
| 13 | 105°C. |
| 15 | 170°C. |

The above readings are not favourable. If replicated in a full scale fire test to AS 1530.4 a fire rating of less than 15 minutes would have been obtained, because of thermal insulation failure at this time.

Examination of the sample after the fire test revealed that the internal corrugation was heavily fragmented, with numerous cracks allowing a rapid flow of heat through the panel.

EXAMPLE 7

This example illustrates the incorporation of ceramic microspheres into a fire resistant composition according to the invention.

A liquid, fire resistant composition was prepared from the following components:

| | |
|---|---|
| calcined flint clay | 300 kg |
| sodium silicate (Vitrosol N) (38% NV) | 300 kg |
| water | 60 kg |
| Envirospheres SLG | 30 kg |
| Alkadet 15 | 0.06 kg |
| Dibasic ester | 10.2 kg |

The ingredients were combined by adding with mechanical stirring the water and Alkadet to the sodium silicate solution. The finely divided calcined flint clay and Envirospheres were then slowly added under constant stirring. After these components had been incorporated the dibasic ester latent acid catalyst was added to form the final composition.

EXAMPLE 8

The coating composition of Example 7 was evaluated by coating corrugated cardboard. 20 pieces of corrugated cardboard sheets, size 2400×1200×14 mm, weight 6.1 kg each, incorporating 3 layers of corrugation, were immersed in the composition of Example 7, drained for a short time, then turned upside down to ensure the liquid mix would cover all areas of corrugation. The boards were drained, then stacked horizontally, separated by a 3 mm thick plastic grid between all units to allow air access, and therefore reduce the drying time.

The boards were weighed after 7 days, showing an average weight of 25.2 kg. The coating in the flutes had a thickness of about 250 $\mu$m.

EXAMPLE 9

A wall unit size 3.23×3.68 m was constructed using 2 layers of coated cardboard from Example 8 on each side of a 90 mm steel stud frame, with fibre glass insulation in the core. This frame is of a design commonly used in housing the studs being spaced 600 mm apart.

The wall was then tested for its effectiveness as a barrier to sound penetration. An excellent value of STC=54 was obtained, comparing favourably with plaster board and fibre cement boards on equal weight basis.

EXAMPLE 10

A wall unit was constructed as per Example 9 except that the surface area was smaller, being 1.1×1.1 m. The unit was subjected to a fire test that gives an indicative fire rating to AS1530.4. The test assesses the performance of the wall with regard to structural integrity and thermal insulation. A very good result was obtained in that it took 110 minutes to reach an average temperature of 160° C. on the unexposed side of the wall unit. If replicated in a full scale test to AS1530.4, a fire rating of 1½ hours would be obtained.

EXAMPLE 11

This example illustrates the use of fly ash as the reactive calcined filler.

A liquid fire retardant composition was prepared from the following components:

| | |
|---|---|
| Gladstone Fly Ash (Pozzolanic Enterprises Pty Ltd) | 4000 g |
| Sodium silicate (Vitrosol N) (38% NV) | 4000 g |
| Water | 600 g |
| Alkadet 15 (Huntsman Chemicals) | 1 g |
| Dibasic ester (DuPont) | 160 g |

The ingredients were combined by adding with mechanical stirring the water and Alkadet to the sodium silicate. The finely divided Fly Ash was then slowly added under constant stirring. After all the Fly Ash had been incorporated the dibasic ester latent acid catalyst was added to form the final composition.

EXAMPLE 12

The coating composition of Example 11 was evaluated by coating corrugated cardboard.

Two pieces of corrugated cardboard sheets, size 250×250×14 mm, weight 135 g each, incorporating three layers of corrugation, were immersed in the composition of Example 11 until fully filled. The sheets were then removed and held vertically until fully drained. This procedure resulted in all cardboard surfaces, including the internal corrugation, being covered by a thin coat of the liquid mixture. The composition also impregnated the cardboard to a certain extent. One of the cardboard pieces was placed on a plastic sheet on a table, and the second piece on top of the first, to form a small panel size 250×250×28 mm. The panels were then left to set overnight. The following day the panel was dry to the touch, with a hard coating. The weight of the panel was 994 g.

EXAMPLE 13

In this Example the coated cardboard from Example 12 was tested for fire resistance.

Coated cardboard from Example 12 was aged for 10 days at room temperature and tested by placing it on a gas burner and exposing it to the flame for one hour. The temperature on the sample side not exposed to the flame was recorded every 5 minutes. The results are as set out in Table 3:

TABLE 3

| Time (Minutes) | Temperature on Unexposed Side |
|---|---|
| 5 | 26°C. |
| 10 | 56°C. |
| 15 | 78°C. |
| 20 | 85°C. |
| 25 | 94°C. |
| 30 | 106°C. |
| 35 | 130°C. |
| 40 | 142°C. |

| Time (Minutes) | Temperature on Unexposed Side |
|---|---|
| 45 | 143° C. |
| 50 | 144° C. |
| 55 | 144° C. |
| 60 | 145° C. |

The above readings represent very favourable results being very similar to Example 2, and showing that calcined flint clay can be replaced with lower cost Fly Ash.

EXAMPLE 14

A liquid fire retardant composition was prepared from the following components:

| | |
|---|---|
| Calcined flint clay (75 μm) | 6000 g |
| sodium silicate (Vitrosol N) (38% NV) | 3000 g |
| water | 1200 g |
| Alkadet 15 (Huntsman Chemicals) | 1 g |
| Dibasic ester (DuPont) | 120 g |

The ingredients were combined by adding with mechanical stirring the water and Alkadet to the sodium silicate solution. The finely divided calcined flint clay was then slowly added under constant stirring. After all the calcined flint clay had been incorporated the dibasic ester latent acid catalyst was added to form the final composition. The ratio of reactive calcined filler to metal silicate calculates as 5.2:1 on a non volatile basis.

EXAMPLE 15

The coating composition of Example 14 was evaluated by coating corrugated cardboard.

Two pieces of corrugated cardboard sheets, size 250×250×14 mm, weight 135 g each, incorporating three layers of corrugation, were immersed in the composition of Example 14 until fully filled. The sheets were then removed and held vertically until fully drained. This procedure resulted in all cardboard surfaces, including the internal corrugation, being covered by a thin coat of the liquid mixture. The composition also impregnated the cardboard to a certain extent. One of the cardboard pieces was placed on a plastic sheet on a table, and the second piece on top of the first, to form a small panel size 250×250×28 mm. The panels were then left to set overnight. The following day the panel was dry to the touch, with a hard coating. The weight of the panel was 1060 g.

EXAMPLE 16

In this Example the coated cardboard from Example 15 was tested for fire resistance.

Coated cardboard from Example 15 was aged for 10 days at room temperature and tested by placing it on a gas burner and exposing it to the flame for one hour. The temperature on the sample side not exposed to the flame was recorded every 5 minutes. The results are as set out in Table 4:

TABLE 4

| Time (Minutes) | Temperature on Unexposed Side |
|---|---|
| 5 | 28°C. |
| 10 | 50°C. |
| 15 | 80°C. |
| 20 | 145°C. |
| 25 | 162°C. |
| 30 | 170°C. |
| 35 | 182°C. |
| 40 | 189°C. |
| 45 | 193°C. |
| 50 | 194°C. |
| 55 | 194°C. |
| 60 | 195°C. |

While the result is not quite as favourable as Example 3, it is still very good, especially in view of the fact that the unexposed side of the panel did not change in appearance, and all six coated layers of corrugation remained essentially intact. Thus, it is clear that the panel made as per Example 15 is capable of acting as a fire barrier, significantly slowing the progress of a fire.

Since modifications within the spirit and scope of the invention may be readily effected by persons skilled in the art, it is to be understood that the invention is not limited to the particular embodiment described, by way of example, hereinabove. As a further example of the use of compositions of the present invention, these may be used in a process for preparing the cellulosic substrate, especially cardboard. Therefore rather than post treating cardboard with the composition of the present invention the cardboard is prepared in the presence of the composition.

What is claimed is:

1. An aqueous fire resistance treatment composition comprising:
   water;
   a metal silicate selected from an alkali metal silicate or an alkaline earth metal silicate;
   a reactive calcined filler;
   a latent acid catalyst.

2. An aqueous fire resistance treatment composition as defined in claim 1 wherein the metal silicate is selected from the group consisting of potassium silicate, sodium silicate and lithium silicate.

3. An aqueous fire resistance treatment composition as defined in claim 1 wherein the metal silicate is selected from the group consisting of beryllium silicate, magnesium silicate and calcium silicate.

4. An aqueous fire resistance treatment composition as defined in claim 2 wherein the metal silicate is selected from the group consisting of sodium silicate and potassium silicate.

5. An aqueous fire resistance treatment composition as defined in claim 4 wherein the metal silicate is sodium silicate.

6. An aqueous fire resistance treatment composition as defined in claim 1 wherein the calcined filler is calcined alumina or calcined alumino silicate.

7. An aqueous fire resistance treatment composition as defined in claim 6 wherein the calcined filler is selected from the group consisting of calcined flint clay, calcined alumina, fly-ash and blast furnace slag.

8. An aqueous fire resistance treatment composition as defined in claim 7 wherein the calcined filler is selected from the group consisting of calcined flint clay, calcined alumina and fly-ash.

9. An aqueous fire resistance treatment composition as defined in claim 1 wherein the calcined filler has a particle size less than 150 μm.

10. An aqueous fire resistance treatment composition as defined in claim 1 wherein the latent acid catalyst is a carboxlic acid ester.

11. An aqueous fire resistance treatment composition as defined in claim 1 wherein the relative weight proportions of reactive calcined filler to metal silicate is in the range 10:1 to 1:1.5.

12. An aqueous fire resistance treatment composition as defined in claim 11 wherein the relative weight proportions of reactive calcined filler to metal silicate is in the range 8:1 to 1:1.1.

13. An aqueous fire resistance treatment composition as defined in claim 12 wherein the relative weight proportion of reactive calcined filler to metal silicate is in the range 5:1 to 1:0.8.

14. A cellulosic substrate treated with a composition as defined in claim 1.

15. An cellulosic substrate as defined in claim 14 wherein a coating of film thickness 50–1000 μm is formed on the substrate.

16. A method of enhancing the fire resistance of a cellulosic substrate by treating it with a composition as defined in claim 1.

* * * * *